Sept. 11, 1962 P. E. STUCKERT 3,054,094

MAGNETIC SHIFT REGISTER

Filed May 15, 1959 2 Sheets-Sheet 1

INVENTOR
PAUL E. STUCKERT

BY Alvin J. Riddles
ATTORNEY

United States Patent Office 3,054,094

Patented Sept. 11, 1962

3,054,094

MAGNETIC SHIFT REGISTER

Paul E. Stuckert, Katonah, N.Y., assignor to International Business Machines Corporation, New York, N.Y., a corporation of New York Filed May 15, 1959, Ser. No. 813,561
17 Claims. (Cl. 340—174)

This invention relates to magnetic switching circuits and storage elements and more particularly to a diodeless type shifting register employing magnetic elements that switch by rotational processes.

The use of bistable magnetic cores in shifting registers and logic circuits has increased since the development of the "Static Magnetic Delay Line," proposed by An Wang and Way Dong Woo, in the Journal of Applied Physics, vol. 21, January 1950, pp. 49–54. The bistable magnetic core is a reliable computer component, but unfortunately the switching speed of the core is limited and one or more diodes has historically been included in the circuit with each core when the core is used in either a shifting register or a logic circuit.

Magnetic materials capable of switching by rotational processes such as thin magnetic films have been found to have the advantage of more rapid switching speeds than conventionally employed magnetic cores and, according to the principles of this invention, have certain magnetic switching properties which allow magnetic elements such as thin film elements to be employed in shifting circuits without the necessity of an isolating diode.

Accordingly, it is an object of this invention to provide a shifting register employing magnetic elements capable of being switched by rotational processes.

It is another object of this invention to provide a diodeless shifting register employing magnetic thin film elements capable of operating at very high speeds.

Still another object of this invention is to provide a bistable magnetic element capable of being read out and reset without inducing a voltage in one winding while inducing a voltage in another winding coupled therewith.

Yet another object of this invention is to provide a bistable magnetic element capable of being switched from one to another stable state which is responsive to an applied field which resets the element and inhibits development of an induced voltage on a winding inductively associated therewith.

The foregoing and other objects, features and advantages of the invention will be apparent from the following more particular description of preferred embodiments of the invention, as illustrated in the accompanying drawings.

The magnetic element employed in this invention is thin magnetic film which is a metallic alloy having a normal magnetic orientation along an axis known as the axis of easy magnetization, and may switch from one stable direction to the other along this axis by rotation. Rotational switching contrasts with domain wall switching of conventional magnetic materials wherein switching is initiated in small regions or domains in the material and once initiated, progresses through the material until the magnetic moments are substantially aligned in the direction of the applied external field. The term "thin film," as herein employed, designates a magnetic element having rotational switching characteristics.

Rotational switching of magnetic thin films may be classified as either coherent or incoherent. Coherent and incoherent rotational switching may be defined in terms of the direction of rotation which the magnetic moments undergo upon application of an applied field. Simultaneous rotation of all the magnetic moments in a thin film material under the influence of an applied field wherein all the moments rotate in a given direction, i.e. all rotate clockwise or counter-clockwise, is termed coherent rotation, while random rotation of the moments, i.e. some clockwise and the remaining counter-clockwise, is termed incoherent rotation. Typical thin film samples which have been switched by rotational reversal of the magnetization have been observed to switch at a much more rapid rate than domain wall switching. Magnetic thin film of the type herein employed is so fabricated that it contains a single axis of easy magnetization, the axis defining two directions of easy magnetization at an angular displacement of 180°.

With reference to the FIGS. 1–4 the different types of rotational switching which takes place in such thin film structures will be discussed to crystallize an understanding of the invention here involved and the unique properties discovered which may be implemented by construction of diodeless type shifting registers.

Figure 1:
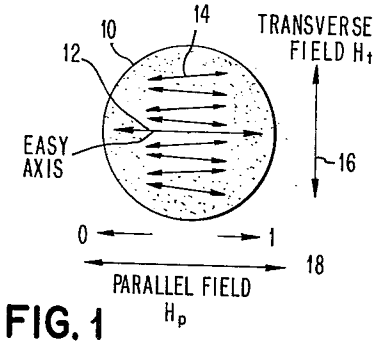
FIG. 1 illustrates a magnetic element in accordance with this invention having a uni-axial anisotropy wherein switching may be accomplished by rotational processes.

With reference to the FIG. 1, a thin film element 10 is shown having an easy direction of magnetization 12. The preferred direction of magnetization 12 of the film 10 is the resultant direction of the magnetic moments 14 within the film 10. It should be noted that not all the moments 14 are exactly aligned with the preferred direction 12, but instead are oriented with some a few degrees in an upward direction, while the others a few degrees in a lower direction. A magnetic field which is applied transverse to the preferred direction of magnetization 12 of the thin film 10 is represented by an arrow 16 hereinafter referred to and symbolized by $H_t$. A transverse field, $H_t$, is defined as a magnetic field parallel to the plane of the film 10 in such a direction as to produce a component of predetermined magnitude perpendicular to the easy axis 12 of the film 10. A parallel field, $H_p$, is defined as a magnetic field parallel to the plane of the film 10 in such a direction as to produce a component of predetermined magnitude parallel to the easy axis 12 of the film 10. Both type fields, $H_t$ and $H_p$ may be applied in either direction. In order to provide a designation for the directions of magnetization which the film 10 may take, the direction of magnetization from right to left is arbitrarily chosen as representing a binary 0, while the direction of magnetization from left to right is chosen as representing a binary 1. If we consider the application of a transverse magnetic field $H_t$ to the element 10, it may be seen that this field is at substantially right angles to each of the magnetic moments 14. This field, $H_t$, applies a torque to all the moments within the element 10 to start rotation of the moments 14 in either the clockwise or counter-clockwise direction depending upon the direction of the applied field. Under the influence of the field $H_t$, the moments 14 of the element 10 would only switch to a maximum of 90° with respect to the preferred direction of magnetization 12. It is therefore incumbent to provide, during the application of the applied field $H_t$, a parallel field, $H_p$, to cause complete reversal of the moments 14. If, then, in combination, a transverse field $H_t$ and a parallel field $H_p$ is applied to the thin film 10, substantially all the moments switch by rotation in a given direction, i.e. either all clockwise or all counter-clockwise, and thus switching is accomplished by coherent rotation. It should be noted that the latter field $H_p$ utilized to accomplish coherent rotation of the moments 14 would not, in and of itself, be of sufficient magnitude to cause reversal, but, in combination with the transverse field, $H_t$, reversal is accomplished.

If a parallel field $H_p$ were applied to the thin film element 10, of such a magnitude to cause switching of the direction of magnetization then, as discussed above, since the individual moments 14 are not in exact alignment with the resultant or preferred direction of magnetization 12, some of the moments 14 would rotate clockwise while the remaining moments 14 would rotate counter-clockwise. Thus, upon application of an applied field which is parallel to the preferred direction of magnetization 12 of the thin film element 10, which is of a sufficient magnitude to cause rotational reversal of the moments 14 switching is accomplished by incoherent rotation.

Although the correlation between the switching phenomena of incoherent and coherent rotational reversal described above with respect to the FIG. 1 of a magnetic material having rotational switching properties such as the film element 10 may be understood in general, a complete picture of the rotational switching processes which the magnetic material herein employed undergoes upon application of the fields $H_p$ and $H_t$ may be crystalized by considering a plot of its switching characteristics. Such a plot is shown in the FIG. 2.

Figure 2:
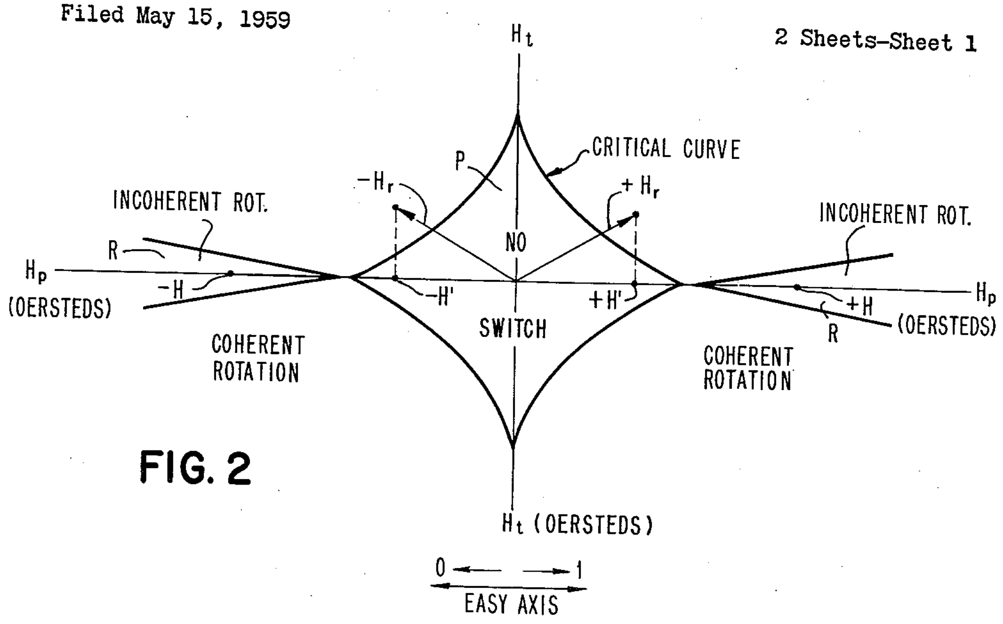
FIG. 2 is a plot of the rotational switching characteristics of the element of FIG. 1.

With reference to the FIGS. 1 and 2, and more particularly to the FIG. 2, the switching characteristic of a magnetic material having properties that are similar to the element 10 of the FIG. 1 is shown which comprises a plot of applied fields $H_t$ vs. $H_p$. The easy axis 12 of the film 10 is shown to be parallel to the horizontal coordinate $H_p$ and the arbitrarily designated remanence directions of 0 and 1 are also indicated. The dark lines which intersect each of the coordinates traversing the different quadrants define the critical region of switching, in that within an area defined by the critical curves, labeled P, there is no rotational switching of the moments 14, and without this area P, rotational switching of the moments 14 does occur. The area P within the critical switching curves is defined as that area in which substantially no switching occurs. In the region wherein switching by rotational processes may take place, i.e. outside the area P, a further area R is defined on either side of the coordinate $H_p$, which is the area in which incoherent switching by rotational process takes place. It may be seen then that coherent switching by rotational processes takes place everywhere outside the areas P and R.

A field, $H_p$, in accordance with the FIG. 1, of sufficient magnitude and rise time capable of incoherently switching the direction of magnetization of a magnetic material exhibiting the rotational switching characteristics of FIG. 2 is designated by points $+H$ and $-H$. An applied field, $H_p$, of insufficient magnitude to cause switching of the element is designated by points $+H'$ and $-H'$. If the field $+H'$ or $-H'$ is applied to a magnetic material having the switching characteristics defined by FIG. 2, reversal of the moments 14 within the material would take place in the presence of an additional field $H_t$ which is of sufficient magnitude to place the resultant field Vector without the area P. Such a resultant Vector is shown and labelled $+H_r$ and $-H_r$ in the FIG. 2. Further, as the magnitude of the field $H_p$ is decreased from the value $H'$, the magnitude of the field $H_t$ must be increased. It should be noted that the transverse applied field, $H_t$, may have either polarity.

Correlating the discussion of FIG. 1 with that of the switching characteristics of FIG. 2, a field, $H_p$, great enough to cause incoherent rotation would have the value $+H$ or $-H$, while the fields applied to the element 10 for causing coherent rotation of the moments 14 would have the value of $H_p$ indicated by the magnitude $+H'$ or $-H'$ with the transverse field, $H_t$ of a magnitude to cause the resultant field Vector to fall without the area P. It should also be noted that the switching time by which coherent rotation of the moments with applied fields having the resultant Vector $H_r$ and the switching time by which incoherent rotation of the moments under the influence of an applied field $H_p$ alone equivalent to the magnitude H has been found to be substantially similar.

Figure 3:
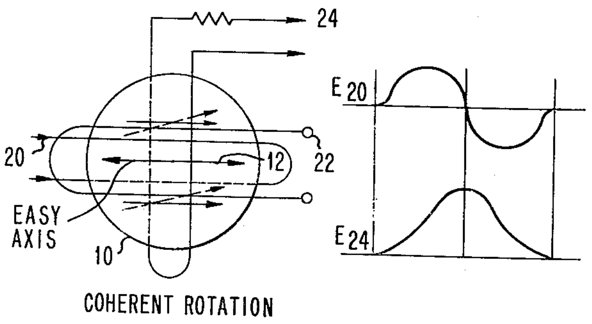
FIG. 3 is a circuit representation of a thin magnetic film element employing coherent rotational switching processes for set and reset operations.

With reference to the FIG. 3, the thin film element 10 is again shown having the easy axis of magnetization 12. The element 10 is now provided with an input winding 20, a reset winding 22 and an output winding 24. The input winding 20 and the reset winding 22 are adapted to apply transverse fields to the element 10 while the output winding 24 is wound in quadrature to both the input and reset windings 20 and 22, respectively. Assuming the element 10 is in the 1 state of residual magnetization, and is to be reset to the 0 state, the reset winding 22 is energized to arbitrarily initiate rotation of the magnetic moments 14 in a counter-clockwise direction. Upon application of a reset field $H_t$ provided by the energization of the reset winding 22, and a parallel field $H_p$, not shown, the domains would rotate counter-clockwise to reverse coherently to the 0 state. The moments 14 in rotating to the 0 state, induce a voltage in the output winding 24 having a waveform similar to that shown and labelled $E_{24}$ and further induce a voltage in the input winding 20 having a waveform similar to that shown and labelled $E_{20}$. The induced voltage $E_{20}$ on the input winding 20 has disadvantages in switching circuits, one of which is the possibility of causing retrograde transfer of information.

Figure 4:
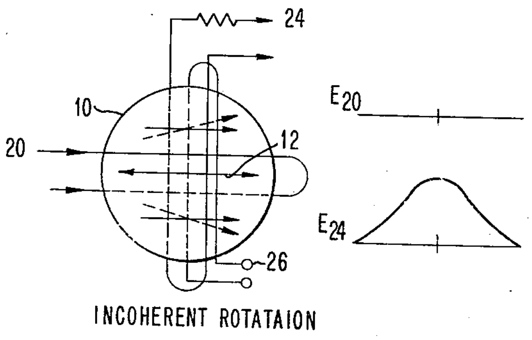
FIG. 4 is a circuit diagram of a thin magnetic film element employing incoherent switching processes for the reset operation in accordance with this invention.

Referring now to the FIG. 4, the thin film element 10 is again shown having the input winding 20, and in quadrature therewith the output winding 24 and a reset winding 26. It should be noted that the reset winding 26 is positioned so as to apply to parallel field, $H_p$, along the easy axis 12 of the element 10. Assuming the element 10 is already in the 1 state and the reset winding is energized to switch the element 10 from the 1 to the 0 state, a large field, $H_p$, is applied to the moments 14 and causes reversal of the magnetization by incoherent rotation. Reversal of the magnetization in the element 10 by incoherent rotation induces a voltage in the output winding 24 having a waveform similar to that shown by the waveform $E_{24}$, while the voltage induced in the input winding 20 by incoherent rotation of the moments 14 is negligible and may be considered as effectively zero. It may be seen, therefore, that reversal of the direction of magnetization in a thin film element along its easy axis of magnetization by means of incoherent rotation results in a negligible induced voltage in an input winding which is parallel to the axial direction of residual magnetization of the element.

It should be noted that the induced voltage on the input winding 20 for the ideal material would be zero, that is, if half the moments 14 were to rotate clockwise while the other half were rotated counter-clockwise. It should be realized that due to minor misalignments or minor flaws in the homogeneity of the film itself, a slight unbalance may exist and there would therefore be a small voltage induced on the input winding 20, but this voltage is small in comparison to that induced on the output winding 24. What is meant then, is that only an appreciable voltage is induced on the output winding 24.

Utilization of this phenomenon may be implemented in a number of ways, one of which is illustrated in a preferred embodiment of this invention wherein a diodeless shifting register is constructed employing two thin film elements per bit, as more fully described below with reference to FIG. 5.

Figure 5:
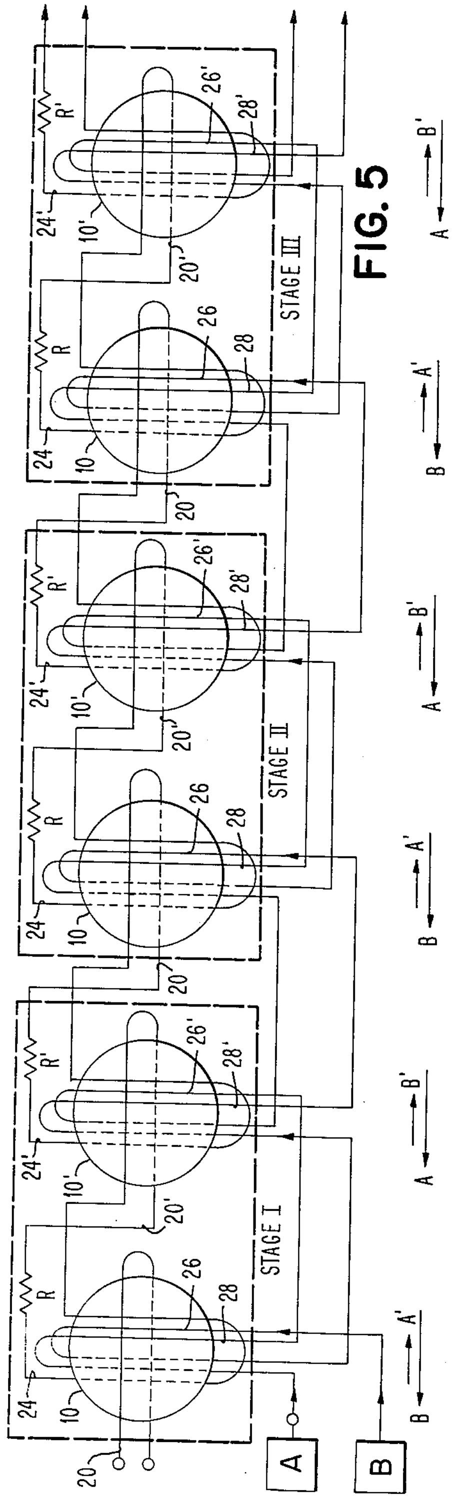
FIG. 5 is a circuit representation of a shifting register in accordance with one embodiment of this invention.
Figure 6:
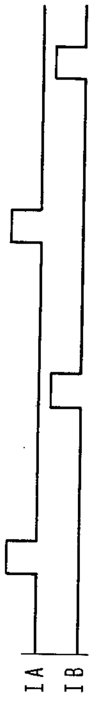
FIG. 6 is a representation of the timing sequence of the various clock pulses employed in the register of FIG. 5 and FIG. 7.

Referring to FIG. 5, three stages I, II and III of of a shifting register in accordance with this invention are shown, wherein each stage is adapted to receive binary information at one time and provide this information to the next stage at a later time. Each stage of the shifting register of FG. 5 is made up of a plurality of thin film elements 10, having an input winding 20, and output winding 24, a reset winding 26, and a shift winding 28. The output winding 24 of each thin film element 10 is serially connected to the input winding 20 of the successive element 10 and a resistor R. The reset winding 26 on alternate elements is serially connected with the shift winding 28 on the next succeeding element to provide two serially connected lines. One of the serially connected lines is connected to a clock pulse source A while the other is connected to a clock pulse source B. The clock pulse sources A and B are adapted to provide a series of pulses when actuated, in sequence displaced in time as is shown in the FIG. 6 and are further adapted to open the circuit in which they are in when not actuated. The relative magnitude of the fields applied by the energization of reset winding 26 and the shift winding 28 by the clock pulse sources $I_a$ and $I_b$ and their relative direction is as indicated below each of the elements 10 and are labelled A, A′, B and B′. The primed fields tend to switch the element 10 to the 1 state while unprimed fields switch the element 10 to the 0 state. Assume, that all the elements 10 and 10′, are in the 0 state except the element 10′ of stage I which is in the 1 state. The field A′ applied to the element 10 of each stage is too small to cause or initiate switching, while the field A applied to the second element 10′ of each stage is large enough to reset the second element 10′ of stage I from the 1 to the 0 state, but does not affect the element 10′ of the stages II and III since they are already in the 0 state. The field A in resetting the element 10′ of stage to the 0 state rotates the moments therein incoherently to provide an induced voltage in its output winding 24′ which energizes the input winding 20 to the element 10 of stage II. Energization of the input winding 20 of the element 10 of stage II provides a transverse field, $H_t$, which in combination with the parallel field $H_p$, applied by the energization of the shift winding 28 by the $I_a$ clock pulse as indicated by the field A′, coherently switches the moments within this element from the 0 to the 1 state. The element 10 of stage II in switching from the 0 to the 1 state induces a voltage on its output winding 24 which tends to switch the element 10′ of stage II to the 1 state, but is prevented from doing so due to the field A applied by action of the $I_a$ clock pulse energizing the reset winding 26′. The voltage induced is then dropped across the resistor R. Upon termination of the $I_a$ clock pulse, the element 10 of stage II is left in the 1 state while the remaining elements of both stages are left in the 0 state. After the $I_a$ clock pulse has terminated, the $I_b$ clock pulse source is actuated to provide a pulse which energizes the reset winding 26 in the element 10 and the shift winding 28′ on the second element 10′ of each of the stages I, II and III to apply fields in each of these elements shown and labelled B and B′. The field B, which is a parallel field $H_p$, rests the element 10 of stage II from the 1 to the 0 state by incoherent rotation, to thus provide an appreciable induced voltage on the output winding 24 only, which energizes the input winding 20′ of the element 10′ of stage II. Energization of the input winding 20′ of the element 10′ of stage II provides a transverse field, $H_t$, thereto, which, in combination with the field B′ switches this element from the 0 to the 1 state. Information is thus shifted from one state to another in the register of FIG. 5 by circuits avoiding the necessity of a diode to prevent retrograde transfer of information.

Consider again the thin film element of FIG. 4. As a practical matter, if the element 10 were in the 0 state when the reset winding 26 is energized, there would be no reversal of magnetization, but there would, however, be a spurious voltage induced in the output winding 24 since the material would be driven into saturation causing a small flux change. The spurious output induced in the winding 24 by a reset field, $H_p$, applied to the film element 10 which is already in the 0 state, could cause forward switching of the elements in the register of FIG. 5.

Referring again to the register of FIG. 5 consider the operation, in the description above, wherein information is transferred from the element 10′ of stage I to the element 10 of stage II during the operation of the $I_a$ clock pulse source. During actuation of the $I_a$ clock pulse source in the register of FIG. 5, the element 10′ of stage II has applied thereto the indicated reset field A. Since this element is already in the 0 state, the direction of magnetization remains unchanged, however, a spurious output is induced in the output winding 24′ which energizes the input winding 20 of the element 10 of stage III. This spurious output voltage then provides a transverse field, $H_t$, to the element 10 of stage III which, in combination with the applied field A′ may cause switching of this element from the 0 to the 1 state.

Figure 7:
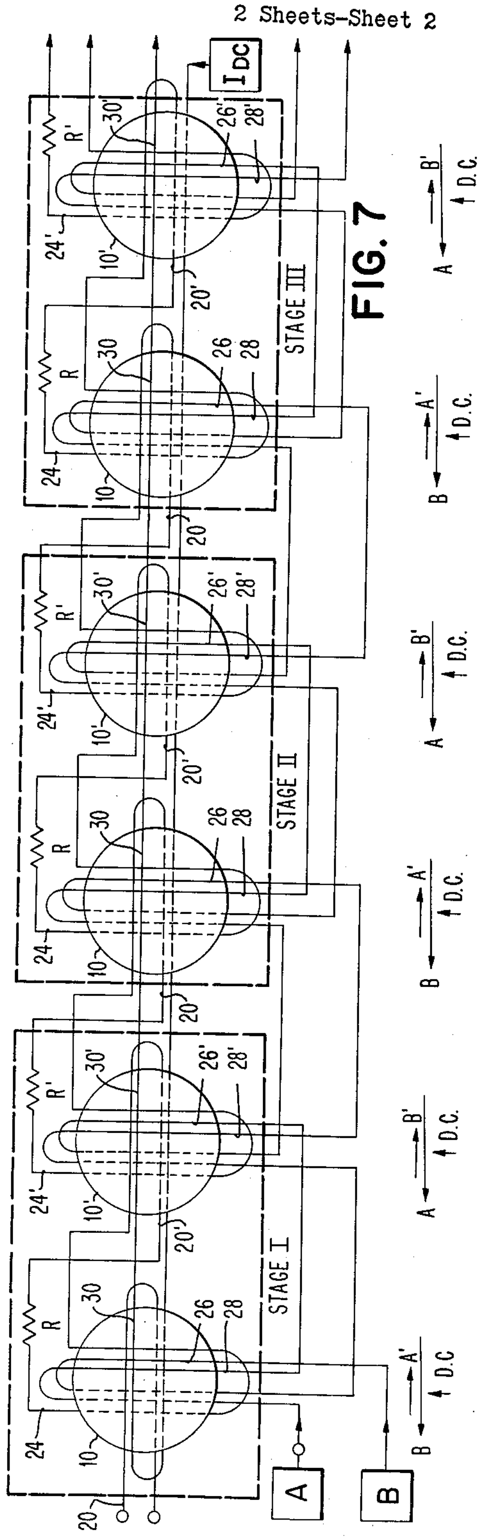
FIG. 7 is another embodiment of the shifting register of FIG. 5.

Accordingly, as a practical matter, the register of FIG. 5 may be constructed wherein thin films may be employed to incorporate a bias field such as that shown in the FIG. 7.

Referring to the FIG. 7, the shifting register of FIG. 5 is shown with the same reference characters but with the addition of a bias winding 30 wound about each element 10 and 10′ of the stages I–III. The bias winding 30 of each element 10 is serially connected to a source $I_{dc}$. The bias winding 30 of each element 10 and 10′ is also wound to provide an applied field transverse to the preferred direction of magnetization of each film. The bias field applied by each of the bias windings 30 with their relative magnitude, is shown by a Vector labelled D.C. below each film element. Operation of the register of FIG. 7 is the same as that of FIG. 5 with the spurious output voltage voltage minimized by the transverse field applied by the bias winding 30. The bias field applied to each of the elements 10 and 10′ is regulated to be too small to permit random coherent switching of the elements upon application of the A′ and B′ fields. It should be noted that the direction of the applied fields, A, A′, B and B′ in the embodiment of FIG. 7 are slightly tilted. The slight tilt of these fields is provided to compensate for the action of the bias field to insure resetting of the film elements by incoherent rotation. To provide the tilt for the fields A, A′, B and B′, the windings associated therewith on each film element are angularly offset slightly so the fields they produce are at an angle to the easy axis of magnetization.

In each of the embodiments described above the resetting field A or B, applied to the film elements have a greater magnitude than the fields A′ and B′. The different field values are obtained by the provision of a different number of turns in the associated windings. If only single turn windings are preferred, two additional clock pulse sources may be provided whereby of the four clock pulse sources, a first would be connected to provide the field A, a second to provide the field A′, a third to provide the field B and the fourth to provide the field B′.

It should be understood that while there has been shown as embodiments of this invention a shifting register or delay line, it is well known that such circuits may be closed upon themselves to form a closed circuit or ring and that such rings may be further utilized as timing devices or switch scalers, wherein the pulses to be reduced may be applied as the clock pulse sources $I_a$ and $I_b$.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A shift register comprising, a series of bistable incoherently switchable magnetic elements each exhibiting an easy axis of remanent flux orientation, input winding means and an output winding on each said element, one input winding of said input winding means of each element coupling the element in alignment with the easy axis thereof, said output winding of each element being angularly displaced from said one input winding and the easy axis, transfer circuit means connecting the output winding of each said element with one input winding of said input winding means of the succeeding element of said register, and means comprising a reset winding coupling said elements in quadrature with the easy axis thereof for incoherently switching said elements to a datum stable state whereby an appreciable voltage is induced only on the output winding of an element initially in an opposite stable state.

2. The shift register of claim 1 wherein the output winding of each element is wound in quadrature to the easy axis of magnetization of the film.

3. The shift register of claim 1 wherein said circuit means is a bi-directional current conductive circuit.

4. An information shift register comprising, a series of thin magnetic film elements having an easy axis of magnetization capable of being switched from one to another direction coherently and incoherently, input winding means inductively associated with each said element, an output winding inductively associated with each said element, transfer circuit means connecting the output winding of each element to one input winding of the succeeding element of said register, a further input winding on each said element for gating information transferred into said elements and causing switching of an element to which said information is transferred from a datum to an opposite direction of magnetization coherently, and means for incoherently switching the elements of said register to the datum direction of magnetization whereby an appreciable voltage is induced only on the output winding of an element initially in the opposite stable state.

5. The register of claim 4, including biasing means for each said element for applying a magnetic field in opposition to the field applied upon energization of said one input winding.

6. The register of claim 5, wherein said means for switching the elements of said register incoherently to a datum direction of magnetization includes a reset winding on each said element wound substantially in quadrature to the easy axis of magnetization of the film.

7. The register of claim 6, wherein said circuit means is a bi-directional current conductive circuit.

8. An information shifting register comprising, a series of magnetic thin film elements having an easy axis of magnetization and capable of being switched from one to another of these directions coherently and incoherently, an input winding on each said element adapted to provide a field transverse to the easy axis of said film when energized, an output winding inductively associated with each said element and wound in quadrature to the easy axis of magnetization, circuit means connecting the output winding of each element to the input winding of the succeeding element of said register, a shift winding for each said element wound substantially in quadrature to the easy axis of said film, a reset winding for each said element wound substantially in quadrature to the easy axis of said film, means connecting the shift winding on alternate elements with the reset winding on the succeeding element of said register, and means for energizing said reset and shift windings to establish a gate for information input signals appearing on the input winding of said elements to switch an element of said register receiving an information input signal coherently from a datum to an opposite stable state and for thereafter resetting said element by incoherently switching the element to the datum stable state whereby an appreciable voltage is induced only on the output winding of an element previously switched to the opposite stable state.

9. The register of claim 8, including biasing means for establishing a field in opposition to that applied upon energization of the input winding on each said element.

10. The register of claim 9, wherein said circuit means is a bi-directional current conductive circuit and serially connects said input and output windings.

11. A storage element comprising, a thin magnetic film element having an easy axis of magnetization and capable of being switched from one to another direction of magnetization coherently and incoherently, an output winding inductively associated with said element and wound in quadrature to the axis of magnetization of said film, an input winding inductively associated with said element for applying a field transverse to the easy axis of said element when energized, gating means inductively associated with said element for gating the field applied by the input winding to coherently switch said element from a datum to an opposite direction of magnetization along the easy axis, and means for applying a field of predetermined magnitude parallel to the easy axis of said element to incoherently switch the element back to said datum direction whereby an appreciable induced voltage appears on said output winding only.

12. In a circuit, a magnetic film element made of material having a plurality of magnetic moments and exhibiting an easy axis of magnetization along which the moments thereof tend to align themselves to define opposite stable states of flux orientation, a first, a second and a third winding coupling said element, means for energizing said first winding to apply a field of predetermined magnitude parallel to the easy axis of said element and cause the magnetic moments of said element to rotate in different directions and switch said element from one to another stable state, said second winding wound on said element in alignment with the easy axis thereof so that the change of flux experienced therein by the magnetic moments of said element rotating in one direction is substantially cancelled by the remainder of the magnetic moments rotating in a different direction, and said third winding wound on said element angularly displaced from said second winding and said easy axis such that a net flux change is experienced therein due to the rotation of the moments of said element in response to said applied field.

13. In a circuit, a magnetic element made of material having a plurality of magnetic moments and exhibiting different stable states of remanent flux orientation along the easy axis of magnetization, a first, a second and a third winding coupling said element, means for energizing said first winding to apply a field of predetermined magnitude and direction to said element and cause said magnetic moments to rotate in different directions, said second winding wound on said element in alignment with the easy axis thereof such that the flux change experienced therein by rotation of the moments of said element in one direction is substantially cancelled by the flux change experienced by the remainder of said moments rotating in a different direction, and said third winding wound on said element in quadrature to said second winding so that the flux change experienced therein by the magnetic moments of said element rotating in said different directions is additive.

14. In a circuit, a magnetic element made of material having a plurality of magnetic moments and exhibiting different stable states of remanent flux orientation along the easy axis of magnetization, a first, a second and a third winding coupling said element, means for energizing said first winding to apply a field of predetermined magnitude and direction to said element and cause substantially half the magnetic moments thereof to rotate in one direction and the remainder to rotate in an opposite direction, the rotation of said magnetic moments in response to the applied field switching said element from one to another stable state, said second winding wound on said element in alignment with the easy axis thereof so the flux change experienced in every portion thereof by the rotation of said magnetic moments in said one direction is substantially cancelled by the flux change experienced by the magnetic moments rotating in the opposite direction, and said third winding wound in quadrature with the easy axis of said element whereby the change of flux experienced therein due to the rotation of the magnetic moments in opposite directions is additive.

15. In a circuit, a magnetic thin film element having a plurality of magnetic moments and exhibiting an easy axis of magnetization along which said moments tend to align themselves to define opposite stable states of remanent flux orientation, a first, a second and a third winding coupling said element, means for energizing said first winding to apply a field of predetermined magnitude substantially parallel to the easy axis of said element and cause the magnetic moments thereof to rotate from one stable state to another stable state in different directions, said second winding wound substantially parallel with the easy axis of said element and experiencing a flux change in every portion thereof by the moments of said element rotating in one direction which is substantially cancelled by the remainder of said moments rotating in a different direction, said third winding wound substantially in quadrature to the easy axis of said element and experiencing a flux change due to the rotation of the moments of said element in response to said applied field which is additive.

16. A storage device comprising an incoherently switchable magnetic thin film element having an easy axis of magnetization defining opposite stable remanent states of flux orientation, a first and a second input winding coupling said element in quadrature with one another with the first winding being in alignment with the easy axis thereof, an output winding coupling said element angularly displaced from said first input winding and said easy axis, said element responsive to the coincident energization of both said input windings to switch from a datum stable state to an opposite stable state, and means for incoherently switching said element to said datum stable state comprising means for energizing only said second input winding whereby an appreciable voltage is induced only on said output winding.

17. A storage device comprising an incoherently and coherently switchable magnetic thin film element having an easy axis of magnetization in defining opposite stable states of remanent flux orientation, a first and a second input winding coupling said element in quadrature with one another with the first input winding being in alignment with the easy axis thereof, an output winding coupling said element in quadrature to the easy axis thereof, said element responsive to the coincident energization of both said first and second input windings to coherently switch from a datum to an opposite stable state, and means for incoherently switching said element to said datum stable state comprising means for energizing only said second input winding to apply a field of predetermined magnitude parallel to the easy axis of said element whereby an appreciable voltage is induced only on said output winding.

References Cited in the file of this patent

UNITED STATES PATENTS

| | | |
|---|---|---|
| 2,753,545 | Lund | July 3, 1956 |
| 2,825,891 | Duinker | Mar. 4, 1958 |
| 2,919,432 | Broadbent | Dec. 29, 1959 |

FOREIGN PATENTS

| | | |
|---|---|---|
| 845,605 | Great Britain | Aug. 24, 1960 |

OTHER REFERENCES

"Thin Films," F. B. Hagedorn, Journal of Applied Physics, Supp. to Vol. 30, No. 4, April 1959, pp. 254S–255S.